United States Patent
Ohashi et al.

(10) Patent No.: US 12,118,250 B2
(45) Date of Patent: Oct. 15, 2024

(54) STORAGE MEDIUM, PRINTING CONTROL METHOD, AND PRINTING CONTROL APPARATUS

(71) Applicant: SEIKO EPSON CORPORATION, Tokyo (JP)

(72) Inventors: Kazuki Ohashi, Shiojiri (JP); Taketo Kuribayashi, Nagano (JP); Yuki Ikeda, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 323 days.

(21) Appl. No.: 17/472,265

(22) Filed: Sep. 10, 2021

(65) Prior Publication Data

US 2022/0091792 A1    Mar. 24, 2022

(30) Foreign Application Priority Data

Sep. 23, 2020   (JP) ................... 2020-158365

(51) Int. Cl.
*G06F 3/12*   (2006.01)

(52) U.S. Cl.
CPC .......... *G06F 3/1205* (2013.01); *G06F 3/1225* (2013.01)

(58) Field of Classification Search
CPC .... G06F 3/1205; G06F 3/1225; G06F 3/1204; G06F 3/1289; G06F 3/1203; B41J 29/393
See application file for complete search history.

(56) References Cited

U.S. PATENT DOCUMENTS

| | | | |
|---|---|---|---|
| 8,941,848 B2 | 1/2015 | Yamada | |
| 9,176,692 B2 | 11/2015 | Sato | |
| 11,487,483 B2 | 11/2022 | Saigusa | |
| 11,789,676 B2 | 10/2023 | Saigusa | |
| 2013/0038887 A1 | 2/2013 | Yamada | |
| 2014/0036311 A1 | 2/2014 | Sato | |
| 2014/0204403 A1* | 7/2014 | Young | G06F 3/1259 358/1.14 |
| 2017/0083800 A1* | 3/2017 | Takamoto | G06K 15/1805 |
| 2017/0279974 A1* | 9/2017 | Mondo | G06F 3/1204 |
| 2020/0004473 A1 | 1/2020 | Saigusa | |
| 2023/0026187 A1 | 1/2023 | Saigusa | |

FOREIGN PATENT DOCUMENTS

| | | | |
|---|---|---|---|
| JP | 2005182486 A | 7/2005 |
| JP | 2007141100 A | 6/2007 |
| JP | 2013041329 A | 2/2013 |
| JP | 2014033401 A | 2/2014 |
| JP | 2020004158 A | 1/2020 |

OTHER PUBLICATIONS

Office Action for JP Patent Application No. JP2020158365, issued on Apr. 30, 2024, 9 pages of Office Action.

* cited by examiner

*Primary Examiner* — Bradley W Thies
(74) *Attorney, Agent, or Firm* — Pramod Chintalapoodi (57) ABSTRACT

There is provided a non-transitory computer-readable storage medium storing a program executed by a computer in a printing control apparatus that is connected to a printing device and configured to receive installation of a printer driver for causing the printing device to perform printing. The program is associated with the printer driver. The program causes the computer to execute acquiring a print request, transmitting the acquired print request to the printer driver, receiving a response based on the print request transmitted by the printer driver, and acquiring print information based on the print request.

23 Claims, 5 Drawing Sheets

STORAGE MEDIUM, PRINTING CONTROL METHOD, AND PRINTING CONTROL APPARATUS

The present application is based on, and claims priority from JP Application Serial Number 2020-158365, filed Sep. 23, 2020, the disclosure of which is hereby incorporated by reference herein in its entirety.

BACKGROUND

1. Technical Field

The present disclosure relates to a storage medium, a printing control method, and a printing control apparatus.

2. Related Art

Techniques of managing print information, such as the print quantity of a printing device, for the purpose of charging according to the number of printed sheets of the printing device have been proposed. For example, JP-A-2007-141100 discloses that, by a printer driver program, the print information is set and the print quantity is calculated.

According to JP-A-2007-141100, the printer driver program has to have the function of, for example, calculating the print quantity. To achieve this, the function relating to print quantity calculation has to be added to each printer driver. Therefore, a driver program to which the function relating to print quantity calculation is added has to be provided to each of printing devices for which print quantity calculation, for example, is to be performed. It is difficult to use such a driver program for a variety of printing devices.

SUMMARY

According to an aspect of the present disclosure, there is provided a non-transitory computer-readable storage medium storing a program executed by a computer in a printing control apparatus that is connected to a printing device and configured to receive installation of a printer driver for causing the printing device to perform printing. The program is associated with the printer driver. The program causes the computer to execute acquiring a print request, transmitting the acquired print request to the printer driver, receiving a response based on the print request transmitted by the printer driver, and acquiring print information based on the print request.

According to another aspect of the present disclosure, there is provided a printing control method performed by a printing control apparatus in which a printer driver for causing a printing device to perform printing runs on an operating system. The printing control method includes causing an information acquisition module lying between the operating system and the printer driver to be installed in advance. The information acquisition module is associated in advance with the printer driver. The printing control method further includes, by the information acquisition module, acquiring a print request, transmitting the acquired print request to the printer driver associated with the information acquisition module, receiving, from the printer driver, a response corresponding to the print request, and acquiring print information based on the print request.

According to still another aspect of the present disclosure, there is provided a printing control apparatus including a communication section connected to a printing device, an execution section in which an operating system runs, a controller configured to control a printer driver and an information acquisition module, and a storage section that stores association information associating the printer driver with the information acquisition module. The controller is configured to, using the information acquisition module, acquire a print request from the operating system, transmit the acquired print request to the printer driver associated with the information acquisition module, acquire print information based on the print request, receive a response corresponding to the print request from the printer driver, and transmit the response corresponding to the print request to the operating system.

DESCRIPTION OF EXEMPLARY EMBODIMENTS

Figure 1:
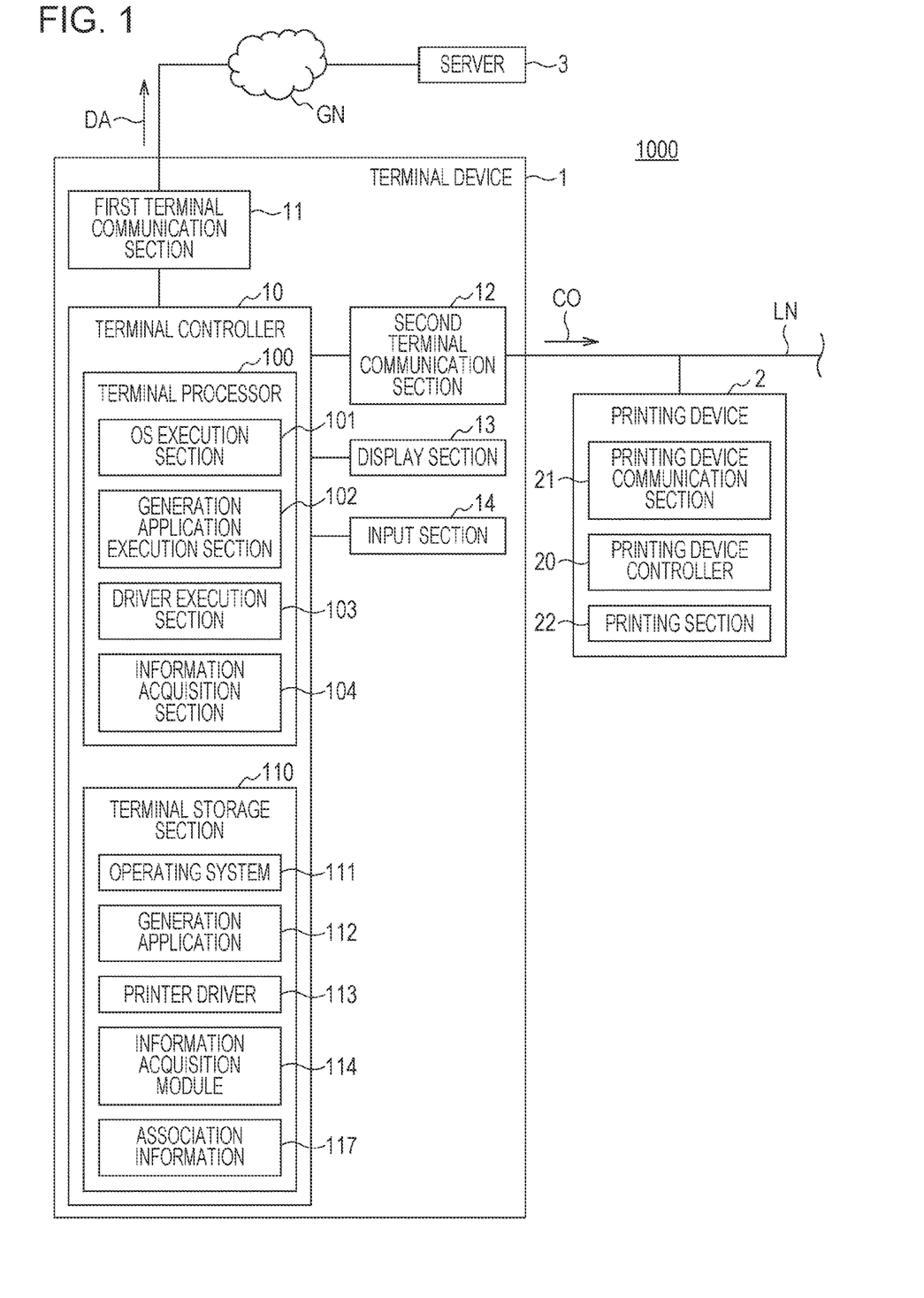
FIG. 1 is a diagram illustrating a configuration of a printing system.

FIG. 1 is a diagram illustrating a configuration of a printing system 1000.

As illustrated in FIG. 1, the printing system 1000 includes a terminal device 1, a printing device 2, and a server 3. The terminal device 1 corresponds to an example of the printing control apparatus.

The terminal device 1 is a personal computer (PC). The terminal device 1 may be a desktop, laptop, or tablet PC. The terminal device 1 is communicably connected to the printing device 2 via a local network LN and is communicably connected to the server 3 via a global network GN.

The global network GN includes leased lines, public networks, the Internet, and the like.

The printing device 2 is a device that prints an image on a printing medium. No restriction is imposed on the type of the printing medium, examples of which include cut sheets of a certain size, roll paper, and sheets of synthetic resin. No restriction is imposed on the printing method of the printing device 2, and thus a printing method of a dot impact type, a thermal sublimation type, a thermal type, or the like may be employed. The printing method of the printing device 2 is an ink jet method.

One or more other printing devices (not illustrated) from different manufacturers or of different models may be connected to the terminal device 1.

The terminal device 1 outputs a print command CO to the printing device 2 over the local network LN, thereby causing the printing device 2 to perform printing. The terminal device 1 transmits print information DA regarding printing, which is to be performed by the printing device 2, to the server 3 over the global network GN.

The printing device 2 includes a printing device controller 20, a printing device communication section 21, and a printing section 22.

The printing device controller 20 is composed of a processor, such as a central processing unit (CPU) or a microprocessor unit (MPU), that executes a program. The printing device controller 20 reads and executes a program by means of the processor, thereby causing various processes to be performed by hardware and software. The printing device controller 20 may include a storage device (not illustrated) storing programs executed by the processor and data processed by the processor.

The printing device communication section 21 is a communication interface that performs communication according to a certain communication standard. The printing device communication section 21 communicates with the terminal device 1 over a local network LN under control of the printing device controller 20. The printing device communication section 21 may be Universal Serial Bus (USB) connected through a USB cable to the terminal device 1 to communicate with the terminal device 1.

The printing section 22 is a printing mechanism for printing an image on a printing medium. The printing mechanism of the printing section 22 includes a print head for discharging ink and a transport mechanism for transporting a printing medium. The printing section 22 may include various sensors for detecting the position and size of a printing medium, a head scan mechanism for scanning a print head, and so on.

The printing device controller 20 controls the printing device communication section 21 to receive the print command CO transmitted by the terminal device 1. The printing device controller 20 controls the printing section 22 in accordance with the print command CO, so that the printing section 22 performs printing on a printing medium.

The server 3 receives the print information DA from the terminal device 1. The server 3 stores the print information DA received from the terminal device 1 in association with the terminal device 1 or the printing device 2. By using the print information DA, the server 3 may, for example, calculate billing information regarding printing performed by the printing device 2.

The print information DA includes at least one of the page count, drawing type, and page settings of printing that the terminal device 1 causes the printing device 2 to perform. The page count is the number of sheets of a printing medium on which the printing device 2 performs printing. The drawing type refers to the type of printing performed by the printing device 2. The printing is classified into color printing, monochrome printing, ordinary document printing, picture printing, and printing in a reduced ink consumption printing mode, and is also classified by print resolution, print density, and the like. The page settings include the size of a printing medium, whether to perform double-sided printing or single-sided printing, and so on. The print information DA may include, in addition to the above, various kinds of information that affect the printing cost of the printing device 2.

The terminal device 1 includes a terminal controller 10, a first terminal communication section 11, a second terminal communication section 12, a display section 13, and an input section 14.

The first terminal communication section 11 is a communication interface that performs communication according to a certain communication standard, and communicates with the server 3, to which the first terminal communication section 11 is connected over the global network GN, under control of the terminal controller 10. The first terminal communication section 11 corresponds to an example of a transmitting section.

The second terminal communication section 12 is a communication interface that performs communication according to a certain communication standard, and communicates with the printing apparatus 2, to which the second terminal communication section 12 is connected over the local network LN, under control of the terminal controller 10. The second terminal communication section 12 corresponds to an example of the communication section.

The display section 13 is a display composed of light emitting diodes (LEDs), organic light emitting diodes (OLEDs), and the like and displays information in a certain manner under control of the terminal controller 10. The display section 13 may be an external device coupled to the terminal device 1.

The input section 14 is an input interface that is coupled to an operating switch provided in the terminal device 1 or an input tool, such as a touch panel, a mouse, or a keyboard, detects an input operation of the user, and outputs a detection result to the terminal controller 10. In response to input from the input section 14, the terminal controller 10 performs processing corresponding to the input operation.

The terminal controller 10 includes a terminal processor 100 and a terminal storage section 110. The terminal processor 100 is a processor that executes a program, such as a CPU or an MPU, and corresponds to an example of a computer that controls the terminal device 1. The terminal controller 10 corresponds to an example of the controller. The terminal storage section 110 corresponds to an example of the storage section.

The terminal processor 100 reads a program stored in the terminal storage section 110 and performs various types of processing using hardware as well as software.

The terminal storage section 110 stores, in a nonvolatile manner, programs executed by the terminal processor 100 and data processed by the terminal processor 100. The terminal storage section 110 stores an operating system 111, a generation application 112, and a printer driver 113. Hereinafter, the operating system is abbreviated as "OS". The terminal storage section 110 may include a volatile storage area to provide a work area of the terminal processor 100.

The terminal processor 100 functions as an OS execution section 101, a generation application execution section 102, a driver execution section 103, and an information acquisition section 104. The OS execution section 101 executes the operating system 111. The generation application execution section 102 executes the generation application 112. The driver execution section 103 executes the printer driver 113. The information acquisition section 104 executes an information acquisition module 114.

The operating system 111 is a program having basic control functions of the terminal controller 10.

The OS execution section 101 executes the operating system 111 to provide communication functions using the first terminal communication section 11 and the second terminal communication section 12, a display function using the display section 13, and an input detection function of receiving input provided by the input section 14. The OS execution section 101 forms a platform on which application programs run.

The generation application 112 is an application program for generating document and image data.

The printer driver 113 is a program for generating the print command CO to be executed by the printing device 2 and transmitting the print command CO. By transmitting the print command CO, the printer driver 113 causes the printing device 2 to perform printing. The driver execution section 103 executes the printer driver 113 to generate the print command CO in accordance with the specifications of the printing device 2. The print command CO includes a command that the printing device 2 may execute, and data on characters and images to be printed on a printing medium by the printing device 2. The print command CO includes data specifying the page count, drawing type, print settings, and the like.

When the terminal device 1 controls another printing device, another printer driver corresponding to the other printing device is installed in the terminal device 1.

The information acquisition module 114 is a program by which, when the terminal device 1 causes the printing device 2 to perform printing, information to be transmitted to the driver execution section 103 by the OS execution section 101 is acquired and the print information DA is generated from the acquired information. The information acquisition section 104 executes the information acquisition module 114 to generate the print information DA and transmits the print information DA to the server 3.

Figure 2:
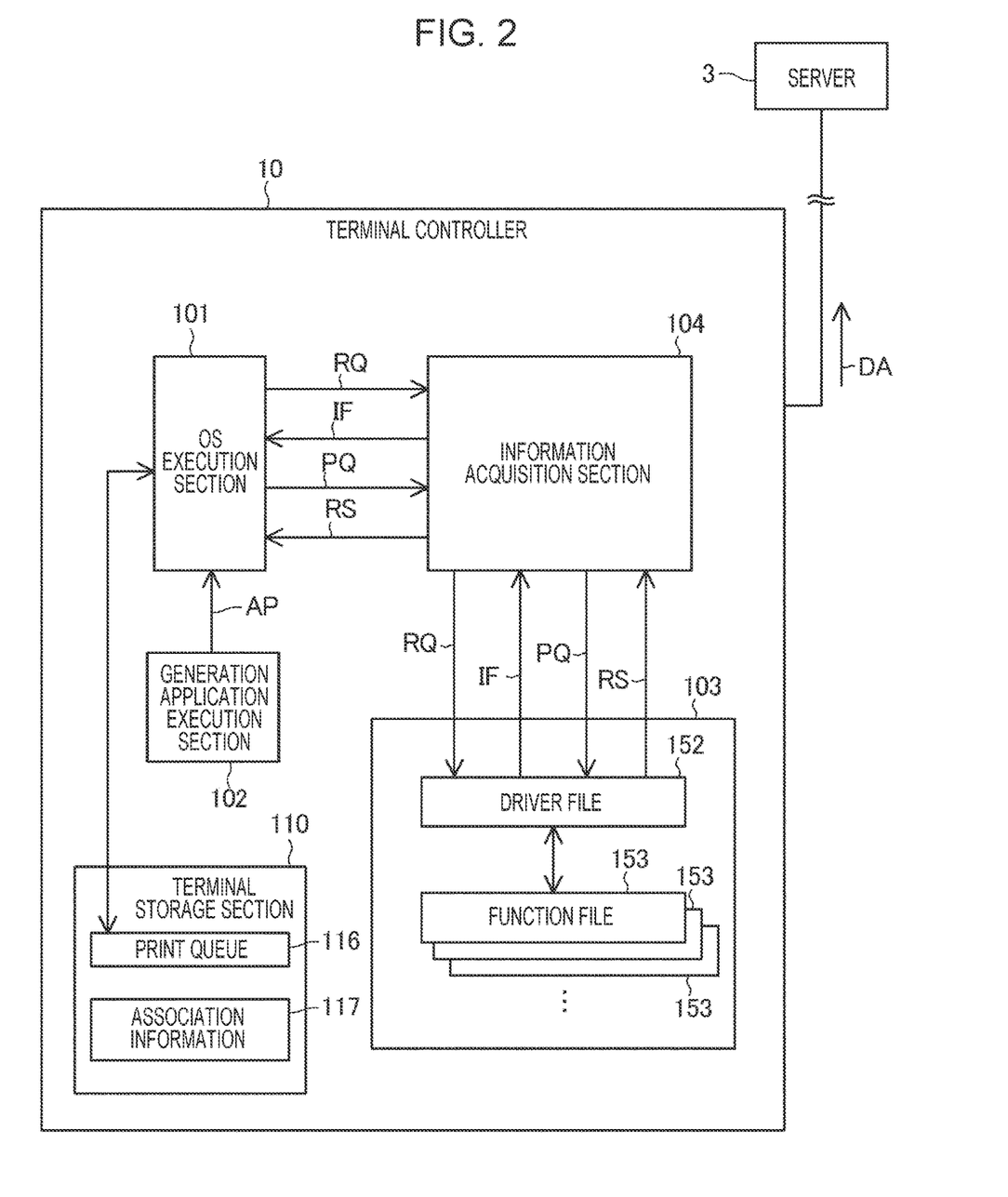
FIG. 2 is a diagram illustrating functions of a terminal controller.

FIG. 2 is a diagram illustrating functions of the terminal controller 10. The driver execution section 103 includes one or more driver files 152 and functional files 153. The driver file 152 and the functional file 153 are files included in the printer driver 113 provided by a vendor or the like of the printing device 2.

A print queue 116 is formed in the storage area of the terminal storage section 110. The print queue 116 stores print jobs to be executed by the printing device 2. The print queue 116 is associated with the printing device 2 and the printer driver 113. Although FIG. 2 illustrates one print queue 116, the terminal storage section 110 may store another print queue that is different from the print queue 116 in terms of the type of the printing device 2, the print port to which the printing device 2 is coupled, and the print settings. In providing an instruction for printing by using the generation application 112 executed by the generation application execution section 102, the user selects the print queue 116.

The generation application execution section 102 runs the generation application 112 on the operating system 111 run by the OS execution section 101, thereby generating document data and image data in accordance with operations of the user. When an instruction to print a document or an image is provided by the user, the generation application execution section 102 generates print data AP. The print data AP corresponds to a print instruction. As mentioned above, the print data AP includes information specifying the print queue 116 selected by the user.

When the generation application execution section 102 outputs the print data AP, the OS execution section 101 acquires the print data AP by using a spooler included in the OS execution section 101. The spooler is an application programing interface (API) provided by the OS execution section 101. In accordance with the print data AP, the spooler of the OS execution section 101 outputs a print request PQ to the driver execution section 103 associated with the print queue 116 specified in the print data AP.

The print request PQ includes a print instruction that instructs the printing device 2 to perform printing, data on characters and images to be printed by the printing device 2, and data specifying print settings. The data specifying print settings includes data specifying the size of a printing medium, data specifying a font, data specifying a print resolution, data specifying image quality, data specifying the positions and sizes of characters and images, data specifying the positions and sizes of margins, and the like.

The one or more driver files 152 have a function of generating the print command CO ready for the printing device 2.

Using the driver file 152, the driver execution section 103 acquires the data on characters and images and the data specifying print settings from the print request PQ. With the driver file 152, the driver execution section 103 performs data processing, such as rendering, in accordance with the data acquired from the print request PQ and generates the print command CO that the printing device 2 may execute. During execution of the driver file 152, the driver execution section 103 calls the function file 153 as the necessity arises and performs data processing. The function file 153 provides a data processing function for character data and image data. The function file 153 compensates for a data processing function that the driver file 152 lacks. A plurality of function files 153 called by a single driver file 152 are available. The number of function files 153 that may be called by the driver file 152 is not limited. The driver execution section 103 transmits the generated print command CO to the printing device 2. After transmitting the print command CO to the printing device 2, the driver execution section 103 receives a printed result RS based on the print command CO, as a response, from the printing device 2.

The response received by the driver execution section 103 is transmitted to the OS execution section 101. The OS execution section 101 causes the response to be stored in the print queue 116 by using the function of a spooler. The print request PQ corresponds to the print job mentioned above. The spooler in the OS execution section 101 causes print jobs stored in the print queue 116 to be sequentially executed by the printing device 2.

When generating the print request PQ, the OS execution section 101 may perform processing provided for the type of processing that the driver execution section 103 is capable of executing and for the type of processing that the driver execution section 103 is incapable of executing.

The OS execution section 101 transmits a request RQ for device driver interface (DDI) function support information IF to the driver execution section 103. The DDI function support information IF is information indicating the types and content of DDI drawing functions that may be executed with the driver file 152. The driver execution section 103 transmits the DDI function support information IF as a response to the request RQ to the OS execution section 101 by using a function of the driver file 152. By referencing the DDI function support information IF, the OS execution section 101 specifies processing that may be performed with the driver file 152.

The DDI function support information IF indicates whether enlargement processing and reduction processing of image data in a certain format may be performed with the driver file 152. If enlargement processing and reduction processing of image data in the certain format may not be performed with the driver file 152, the OS execution section 101 performs the enlargement processing and reduction processing by using the function of the OS execution section 101.

The OS execution section 101 holds the DDI function support information IF in association with the driver file 152. When the driver execution section 103 includes a plurality of driver files 152, the OS execution section 101 holds the DDI function support information IF transmitted from each of the driver files 152. The OS execution section 101 may perform processing in accordance with the function of each driver file 152.

In accordance with the DDI function support information IF, the OS execution section 101 may determine whether there is processing that may not be performed with the driver file 152. In outputting the print request PQ, if processing of generating the print command CO includes processing that may not be performed with the driver file 152, the OS execution section 101 generates the print request PQ that has undergone the processing in question.

As illustrated in FIG. 2, the terminal controller 10 includes the information acquisition section 104, and the information acquisition section 104 transmits and receives information between the OS execution section 101 and the driver file 152. The information acquisition section 104 receives the request RQ and the print request PQ output by the OS execution section 101.

The information acquisition section 104 outputs the request RQ output by the OS execution section 101 to the driver execution section 103. The driver execution section 103 outputs the DDI function support information IF to the information acquisition section 104. When the information acquisition section 104 outputs the print request PQ to the driver execution section 103, the driver execution section 103 generates the print command CO and outputs a response result to the information acquisition section 104. The information acquisition section 104 is handled as the transmission source of the request RQ and the print request PQ.

The information acquisition section 104 outputs the DDI function support information IF output in response to the request RQ by the driver execution section 103 to the OS execution section 101. The information acquisition section 104 outputs the print result RS generated in accordance with the print request PQ by the driver execution section 103 to the OS execution section 101.

The information acquisition section 104 serves as the destination to which the OS execution section 101 transmits the request RQ and the print request PQ, and serves as the source that transmits the DDI function support information IF and the print result RS. For the OS execution section 101, the information acquisition section 104 functions as a printer driver similar to the driver execution section 103. The information acquisition section 104 is a virtual printer driver and does not have a function of, for example, generating the print command CO. However, the information acquisition section 104 functions as a single printer driver for the OS execution section 101.

The information acquisition section 104 acquires the request RQ and the print request PQ from the OS execution section 101. The print request PQ includes information for generating the print information DA. The information acquisition section 104 acquires the print request PQ without modifying the functions of the OS execution section 101 and the driver execution section 103, thereby enabling the print information DA to be generated efficiently.

Figure 3:
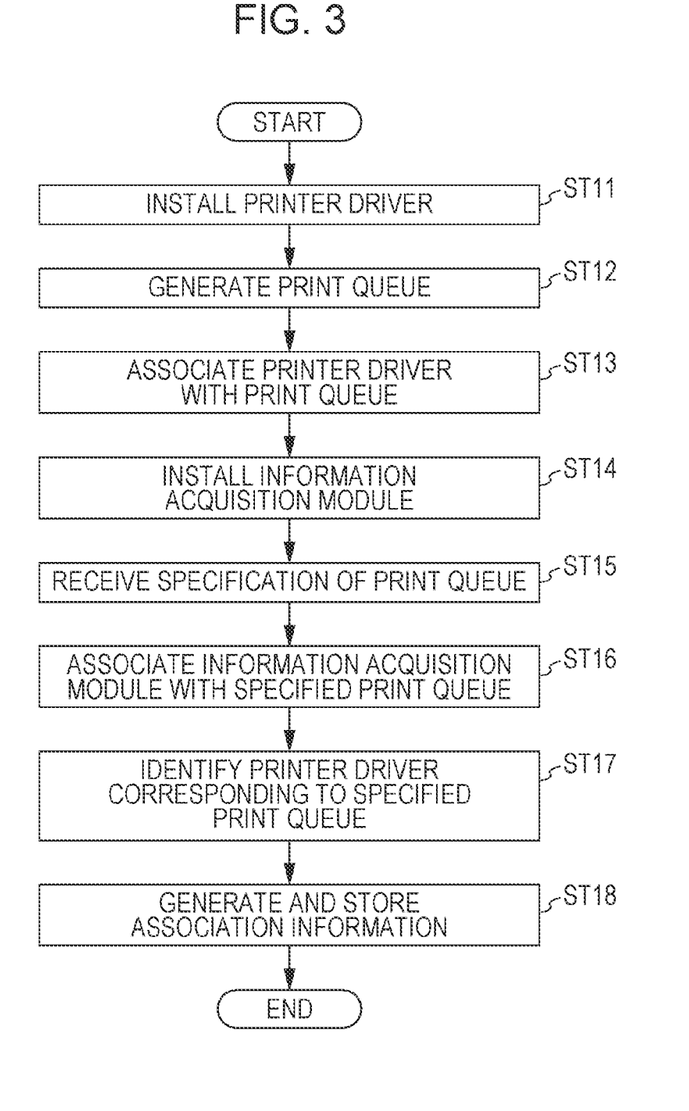
FIG. 3 is a flowchart illustrating a procedure and operations regarding installation of a printer driver and an information acquisition module.

FIG. 3 is a flowchart illustrating a procedure and operations regarding installation of the printer driver 113 and the information acquisition module 114.

According to the procedure illustrated in FIG. 3, the printer driver 113 is installed in the terminal device 1 (step ST11). During installation of the printer driver 113 or after the installation of the printer driver 113, the print queue 116 specifying the printing device 2 and the print port and the like of the printing device 2, which are set by the user, is generated (step ST12). The printer driver 113 is associated with the print queue 116 generated in step ST12 (step ST13).

After the print driver 113 has been installed, the information acquisition module 114 is installed in the terminal device 1 (step ST14). During installation work of the information acquisition module 114, one of the existing print queues 116 to be associated with the information acquisition module 114 is specified by an operation of the user or according to a predefined setting. The terminal controller 10 receives the specification of the print queue 116 (step ST15) and associates the information acquisition module 114 with the specified print queue 116 (step ST16).

The terminal controller 10 identifies the printer driver 113 associated with the print queue 116 specified in step ST15 (step ST17). The terminal controller 10 generates association information 117 for reflecting the association in steps ST16 and ST17 and stores the generated association information 117 in the terminal storage section 110 (step ST18).

The association information 117 is information associating the print queue 116 and the printer driver 113 with the information acquisition module 114. When, in a printing process described later, the print queue 116 is specified by the generation application execution section 102, the OS execution section 101 determines according to the association information 117 whether the print queue 116 is associated with the information acquisition module 114.

The information acquisition module 114 does not have a function of generating the print command CO, and thus if the OS execution section 101 determines that the print queue 116 is associated with the information acquisition module 114, the OS execution section 101 transmits the print request PQ to the information acquisition module 114, which then transmits the print request PQ to the driver execution section 103. In the driver execution section 103, processing of generating the print command CO is performed by the printer driver 113. The printer driver 113 associated with the print queue 116, which is associated with the information acquisition module 114 by using the association information 117, generates the print command CO.

When the information acquisition module 114 is regarded as a virtual printer driver and print settings are configured with the information acquisition module 114, it is desirable that the user reflect the content of print settings in the printer driver 113. The terminal controller 10 performs operations illustrated in FIG. 4, thereby enabling print settings to be configured in the printer driver 113 by using the information acquisition module 114.

Figure 4:
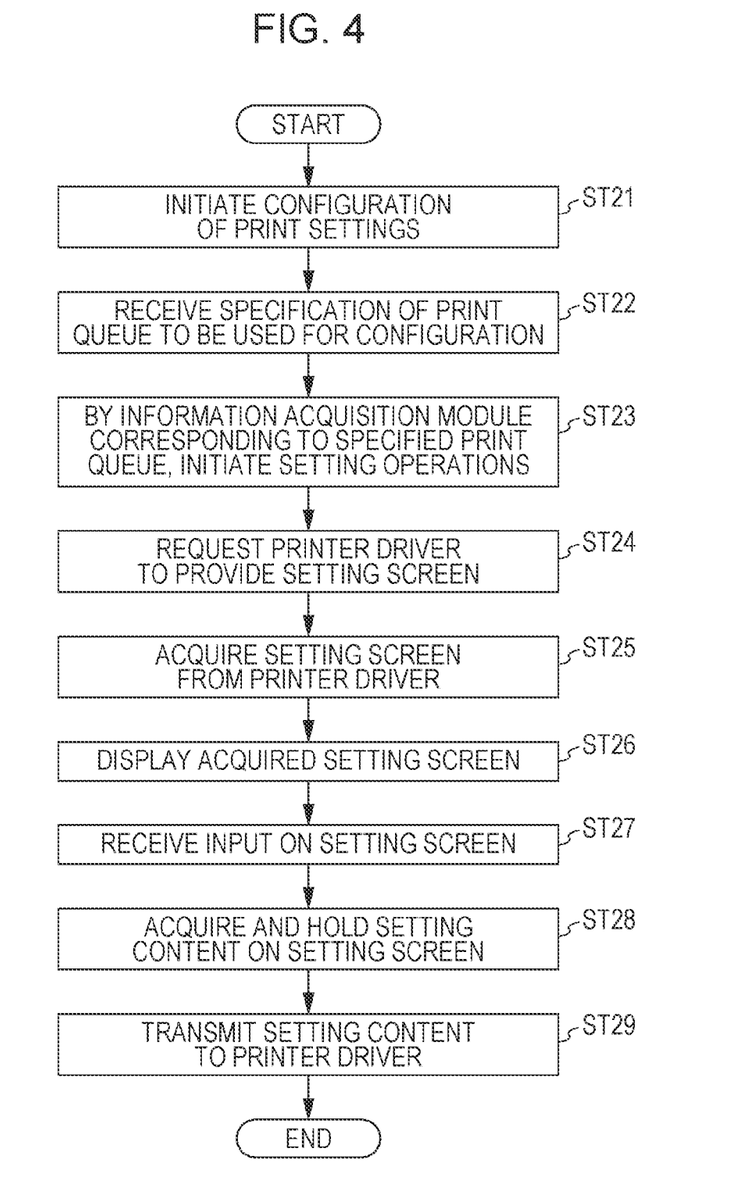
FIG. 4 is a flowchart illustrating operations of a terminal device.

FIG. 4 is a flowchart illustrating operations of the terminal device 1, illustrating operations regarding print settings.

Configuration of print settings is initiated by a user operation with the generation application execution section 102 or the OS execution section 101 (step ST21). The terminal controller 10 receives an operation specifying the print queue 116 to be used for configuration (step ST22). The configuration of print settings is performed on the print queue 116.

The terminal controller 10 calls the information acquisition module 114 associated with the print queue 116 specified in step ST22, and the information acquisition section 104 initiates setting operations in response to the calling (step ST23).

The information acquisition section 104 requests the printer driver 113 executed by the driver execution section 103 to provide a setting screen (step ST24). The setting screen is a print settings screen that displays items capable of being set for operations of the driver execution section 103, thereby enabling input for each item. The content of the setting screen depends on the functions of the printer driver 113. In step ST24, the information acquisition section 104 requests the printer driver 113, associated with the print queue 116, which is associated with the information acquisition module 114 by using the association information 117, to provide a setting screen. The information acquisition section 104 acquires a setting screen from the printer driver 113 (step ST25) and causes the display section 13 to display the acquired setting screen by using the function of the operating system 111 (step ST26). The operating system 111 causes a setting screen provided for the printer driver 113, which generates the print command CO, to be displayed, allowing the user to perform setting operations.

The information acquisition section 104 receives input on the setting screen displayed in step ST26 (step ST27) and acquires and saves the setting content (step ST28). The information acquisition section 104 transmits the acquired setting content to the printer driver 113 that has been requested in step ST24 to provide a setting screen (ST29). The setting content input on the setting screen by the user is reflected in the printer driver 113, which generates the print command CO.

Figure 5:
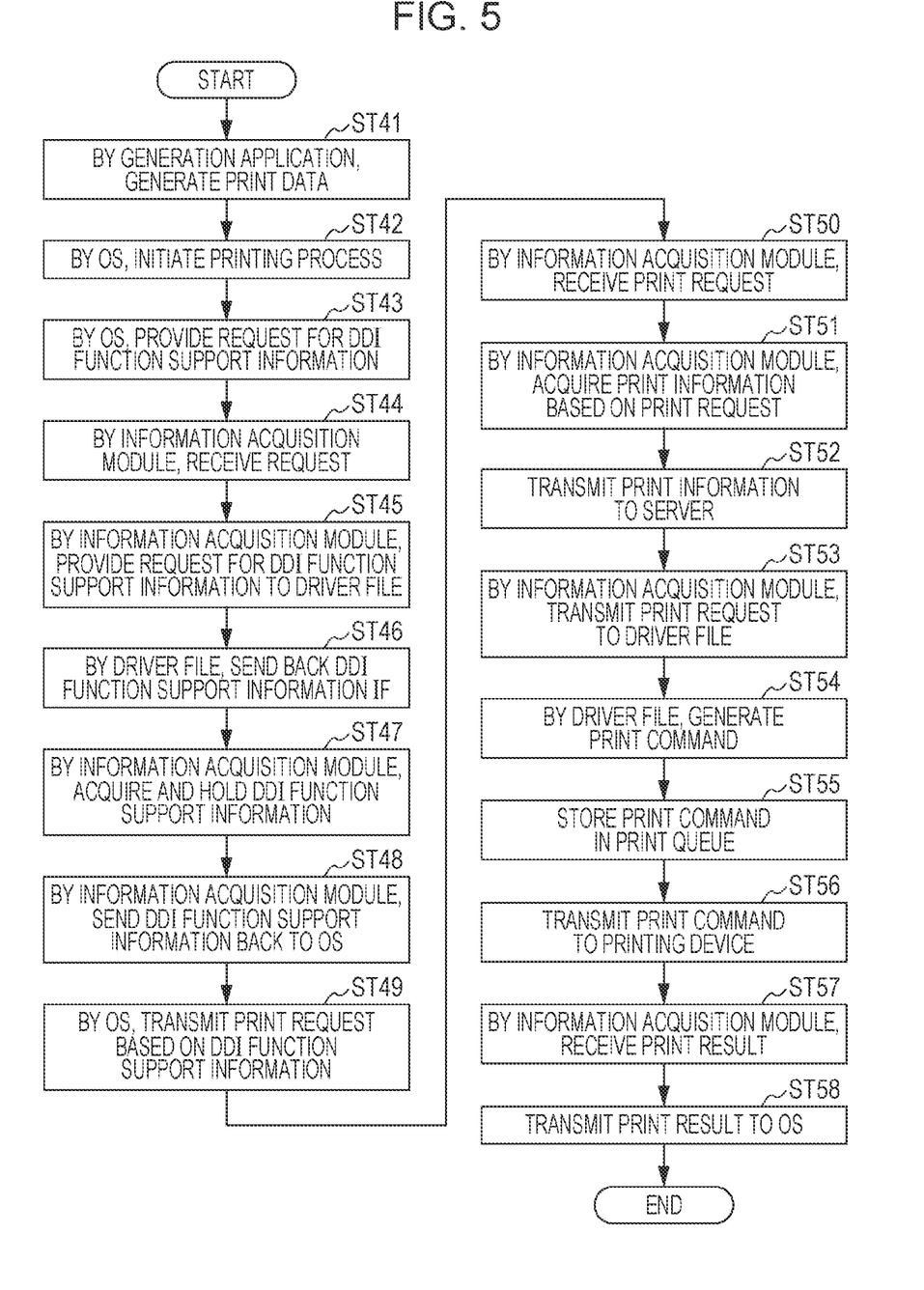
FIG. 5 is a flowchart illustrating operations of the terminal device.

FIG. 5 is a flowchart illustrating operations of the terminal device 1, illustrating operations regarding a printing process.

In accordance with operations of the user with the generation application execution section 102, the generation application execution section 102 generates and outputs the print data AP (step ST41). The print data AP includes information specifying the print queue 116 specified by the user in providing an instruction for printing or the print queue 116 set by default with the OS execution section 101.

The OS execution section 101 detects that the generation application execution section 102 has output the print data AP, and initiates the printing process (step ST42).

The OS execution section 101 transmits the request RQ for the DDI function support information IF to the printer driver 113 associated with the print queue 116 (step ST43). The destination of the transmission in step ST43 is the information acquisition module 114 associated with the print queue 116. The request RQ corresponds to an example of a support information request.

The information acquisition module 114 executed by the information acquisition section 104 receives the request RQ (step ST44) and transmits the request RQ to the driver file 152, thereby requesting the driver file 152 to provide the DDI function support information IF (step ST45). The request RQ that the information acquisition section 104 transmits to the driver file 152 desirably has a format similar to that of the request RQ that the OS execution section 101 has transmitted to the information acquisition module 114. The information acquisition module 114 outputs the request RQ received from the OS execution section 101, in the same format without being converted, to the driver file 152. The driver file 152 may run similarly to the case where the driver file 152 receives the request RQ directly from the OS execution section 101. The driver file 152 may run similarly to the case where the information acquisition module 114 is not installed.

The driver file 152 receives the request RQ from the information acquisition module 114 and transmits the DDI function support information IF as a response to the request RQ (step ST46). The DDI function support information IF corresponds to an example of support information.

The information acquisition module 114 acquires and holds the DDI function support information IF transmitted from the driver file 152 (step ST47) and transmits the DDI function support information IF to the OS execution section 101 (step ST48). The DDI function support information IF that the information acquisition module 114 transmits to the OS execution section 101 is desirably similar to the DDI function support information IF that the driver file 152 has output. The information acquisition module 114 transmits the DDI function support information IF received from the driver file 152 to the OS execution section 101. The OS execution section 101 may operate similarly to the case where the OS execution section 101 receives the DDI function support information IF directly from the driver file 152. The OS execution section 101 may operate similarly to the case where the information acquisition module 114 is not installed.

The OS execution section 101 references the DDI function support information IF, generates the print request PQ in accordance with the print data AP, and outputs the print request PQ (step ST49). The destination of the print request PQ is the information acquisition module 114 when the information acquisition module 114 is associated with the print queue 116. When the inform acquisition module 114 is not associated with the print queue 116, the destination of the print request PQ is the printer driver 113 associated with the print queue 116.

The information acquisition module 114 receives the print request PQ (step ST50). The information acquisition module 114 acquires the print information DA from the print request PQ (step ST51) and transmits the print information DA to the server 3 (step ST52).

In step ST51, the information acquisition module 114 may handle information extracted from the print request PQ as the print information DA. Alternatively, the information acquisition module 114 may analyze an instruction and a command included in the print request PQ to obtain the number of pages, a drawing type, page settings, and the like, and may generate the print information DA. The information acquisition module 114 may detect a command that calls DDI drawing functions from the print request PQ, and perform processing of identifying the drawing type from the color information of Public Devmode, processing of calculating the number of pages from the number of times that the StartPage function is called, processing of calculating the number of pages from the number of drawing instructions such as TextOut, and so on.

The OS execution section 101 or the information acquisition module 114 has, in advance, specification information that specifies the server 3 as a transmission destination to which the print information DA is transmitted in step ST52. The specification information is set during installation of the information acquisition module 114 in the terminal device 1.

After receiving the print request PQ, the information acquisition module 114 transmits the print request PQ to the driver file 152 of the printer driver 113 associated with the print queue 116 (step ST53). In accordance with the print request PQ, the driver file 152 generates the print command CO for use for the printing device 2 and transmits the print command CO to the OS execution section 101 (step ST54).

The OS execution section 101 stores the print command CO in the print queue 116 (step ST55).

The print command CO stored in the print queue 116 is transmitted to the printing device 2 (step ST56). When the printing device 2 receives the print command CO and performs printing, the print result RS based on the print command CO is transmitted from the printing device 2. The driver execution section 103 or the driver file 152 receive the print result RS.

The information acquisition module 114 transmits the print request PQ from the OS execution section 101 to the driver file 152. This allows the driver file 152 to perform processing similar to that performed when the driver file 152 receives the print request PQ directly from the OS execution section 101. The driver file 152 calls the function file 153 as the necessity arises in data processing of generating the print command CO. The function file 153 provides a data processing function for character data and image data to the driver file 152.

The driver file 152 transmits the print result RS as a response to the information acquisition module 114, which is the transmission source of the print request PQ, and the information acquisition module 114 receives the print result RS (step ST57). The print result RS corresponds to an example of a response to the print request PQ. The information acquisition module 114 transmits the print result RS received from the driver file 152 to the OS execution section 101 (step ST58).

The terminal device 1 may omit some of the steps illustrated in FIG. 5 if certain conditions are met. By way of example, the OS execution section 101 performs steps ST21 to ST37 when performing the printing process for the first time after power-on of the terminal device 1, and performs steps ST21, ST22, and steps ST29 to ST37 when performing the printing process for the second or more time.

As described above, the terminal device 1 is a device that is connected to the printing device 2 and in which the printer driver 113 to transmit the print command CO to the printing device 2 is installed. The information acquisition module 114 is a program executed by the terminal processor 100 of the terminal device 1. The information acquisition module 114 is associated with the printer driver 113. The information acquisition module 114 causes the print request PQ to be acquired, and causes the acquired print request PQ to be transmitted to the printer driver 113. The information acquisition module 114 causes the print command CO, which is a response transmitted in response to the print request PQ by the printer driver 113, to be received, and causes the print information DA based on the print request PQ to be acquired.

The print information DA regarding printing performed by the printing device 2 may be acquired from the print request PQ by installing a virtual printer driver without modifying the printer driver 113. As a result, for the printing process performed by the printing device 2, it is made possible to calculate the print quantity and to calculate and charge the printing cost. The printer driver 113 created for use for the printing device 2 is available. By adding the information acquisition module 114 as a virtual printer driver to the terminal device 1 that uses the driver file 152 created by a vendor or the like of the printing device 2, the function of acquiring the print information DA may be implemented. Without being limited to the models and specifications of the printer driver 113 and the printing device 2, the functions of, for example, calculating the print quantity may be achieved for various types of printing devices 2.

The terminal device 1 is connected to the server 3. The information acquisition module 114 causes the print information DA acquired based on the print request PQ to be transmitted to the server 3 by the first terminal communication section 11 included in the terminal device 1. The print information DA useful for, for example, calculating print quantity and printing cost of the printing device 2 may be collected by the server 3. Therefore, using the server 3, charging and the like for use of the printing device 2 may be performed.

In response to receiving a request regarding print settings, the information acquisition module 114 causes the printer driver 113 to be requested to provide a setting screen. The information acquisition module 114 acquires information regarding display of the setting screen from the printer driver 113. Thus, by using the function of the information acquisition module 114, the terminal device 1 may cause a setting screen provided for the printer driver 113 to be displayed.

In accordance with the information acquired from the printer driver 113, the information acquisition module 114 causes the display section 13 included in the terminal device 1 to be controlled so as to display the setting screen. By using the function of the information acquisition module 114, the terminal device 1 may display a setting screen provided for the printer driver 113.

When the generation application 112 executed by the terminal device 1 requests that the print settings screen be displayed, the information acquisition module 114 causes a request regarding print settings to be received. In accordance with information acquired from the printer driver 113, the information acquisition module 114 causes the display section 13 to display the print settings screen of the generation application 112. By using the function of the information acquisition module 114, the terminal device 1 may display the print settings screen provided for the printer driver 113 in response to a request regarding print settings, allowing the print settings to be configured.

The information acquisition module 114 causes setting information set on the print settings screen to be acquired and causes the acquired setting information to be transmitted to the printer driver 113. Thereby, once the terminal device 1 has caused print settings to be configured by using the function of the information acquisition module 114, the terminal device 1 may reflect the print settings in the printer driver 113. Therefore, the terminal device 1 may cause the printer driver 113 to function in accordance with the settings, thereby creating the print command CO corresponding to the print settings.

The information acquisition module 114 causes specification of the print queue 116, in which a print instruction output by the generation application 112 is stored, to be received. The information acquisition module 114 causes the printer driver 113 associated with the specified printer queue 116 to be identified and causes the print queue 116 to be associated with the identified printer driver 113. When printing is requested such that the print queue 116 is specified, the terminal device 1 may execute the information acquisition module 114 to acquire the print information DA.

When the OS execution section 101 of the terminal device 1 transmits the request RQ requesting the DDI function support information IF, the information acquisition module 114 causes the request RQ to be received and causes the request RQ received from the OS execution section 101 to be transmitted to the printer driver 113. The terminal device 1 may acquire the DDI function support information IF by executing the printer driver 113. The terminal device 1 may cause the printing device 2 to perform printing by executing the printer driver 113, which is created by a vendor or the like of the printing device 2, similarly to the case where the information acquisition module 114 is not present.

In the embodiment described above, a printing control method performed by the terminal device 1 in which the printer driver 113, which transmits the print command CO to the printing device 2, and the information acquisition module 114 are installed includes operations described below. According to the printing control method, the information acquisition module 114 is associated in advance with the printer driver 113. The information acquisition module 114 acquires the print request PQ and transmits the acquired print request PQ to the printer driver 113 associated with the information acquisition module 114. The information acquisition module 114 receives a response corresponding to the print request PQ from the printer driver 113 and acquires the print information DA based on the print request PQ.

In the embodiment described above, the terminal device 1 includes the second terminal communication section 12 connected to the printing device 2, and the terminal controller 10 including the printer driver 113 and the information acquisition module 114. The terminal device 1 includes the terminal storage section 110 that stores the association information 117 associating the printer driver 113 with the information acquisition module 114. The terminal controller 10 acquires the print request PQ using the information acquisition module 114 and transmits the acquired print request PQ to the printer driver 113 associated with the information acquisition module 114. The terminal controller 10 receives a response corresponding to the print request PQ from the printer driver 113 and acquires the print information DA based on the print request PQ.

According to the terminal device 1 and the printing control method performed by the terminal device 1, the terminal device 1 may acquire the print information DA regarding printing performed by the printing device 2 from the print request PQ. Therefore, for the printing performed by the printing device 2, the printing system 1000 may calculate the print quantity and perform calculation and charging of printing cost. According to this configuration, the terminal device 1 may use the printer driver 113 created to correspond to the printing device 2. For example, the function of acquiring the print information DA may be implemented by adding the information acquisition module 114 to the terminal device 1 that uses the driver file 152 created by a vendor or the like of the printing device 2. Accordingly, the printing system 1000 may achieve the functions of, for example, calculating the print quantity for various types of printing devices 2, without being limited to the models and specifications of the printing devices 2.

The embodiment described above illustrates an aspect, and modifications and applications may be made.

For example, although the embodiment described above illustrates a configuration in which one information acquisition module 114 and one printer driver 113 are installed in the terminal device 1, this is not limitative. In a configuration in which another printer driver provided for another printing device different from the printing device 2 is installed in the terminal device 1, the terminal controller 10 may include a second information acquisition module for use with the other printer driver. The second information acquisition module has the same function as the information acquisition module 114. Alternatively, there may be a configuration in which the information acquisition module 114 is for use with both the printer driver 113 and another printer driver. It is sufficient that, by using the association information 117, the information acquisition module 114 be associated with the print queue 116, and the printer driver 113 and another printer driver be associated with a combination of the information acquisition module 114 and the print queue 116.

The association information 117 is information indicating an association among the print queue 116, the information acquisition module 114, and the printer driver 113, and the form thereof is not limited. The print queue 116 specifies the information acquisition module 114 as a virtual printer driver and associates the information acquisition module 114 with the printer driver 113 associated with the print queue 116. When the print request PQ is transmitted to the print queue 116, the print queue 116 transmits the print request PQ to the information acquisition module 114 as the specified virtual printer driver. There may be a configuration in which the information acquisition module 114 transmits the print request PQ to the driver execution section 103 that executes the printer driver 113 associated with the information acquisition module 114 by using the association information 117, and acquires the print information DA.

The printing device 2 may be a multi-function printer having functions other than the printing function, such as a scan function and a facsimile function.

The terminal controller 10 may include a plurality of processors, or may include chips integrated together with a read-only memory (ROM), a random-access memory (RAM) and other peripheral circuits.

The configurations illustrated in FIG. 1 and FIG. 2 are exemplary, and no restriction is imposed on a specific implementation of the terminal device 1. It is unnecessary to implement hardware corresponding to the components illustrated in FIG. 1. Some of the functions implemented by software may be replaced by hardware or some of the functions implemented by hardware may be implemented by software. In addition, detailed configurations of the other components of the terminal device 1, the printing device 2, and the server 3 may be changed arbitrarily.

The process units illustrated in FIGS. 3, 4, and 5 are units into which the process is divided according to the main processing content for easy understanding of operations of the terminal device 1, and are not limited by how the process units are divided and what are the names of the process units. The process units may be divided into more step units according to the processing content. The division may also be made so that a single step unit includes still more processes. Additionally, the order of steps may be replaced appropriately without compromising the gist of the present disclosure.

What is claimed is:

1. A non-transitory computer-readable storage medium storing a program executed by a computer in a printing control apparatus, the program causing the computer to execute:
   acquiring a print request;
   controlling, based on the acquired print request, a printer driver of the computer to cause a printing device to print;
   receiving a response based on the print request from the printer driver; and
   acquiring print information related to calculation of one of a print quantity or a cost of execution of the printing by the printing device, wherein the print information is acquired based on the print request.

2. The non-transitory computer-readable storage medium according to claim 1, wherein
   the printing control apparatus is connected to a server, and
   the program further causes the computer to execute transmitting the print information to the server.

3. The non-transitory computer-readable storage medium according to claim 1, the program further causes the computer to execute:
   receiving a request regarding a print setting;
   requesting the printer driver to provide a setting screen based on the request; and
   acquiring the setting screen from the printer driver.

4. The non-transitory computer-readable storage medium according to claim 3, the program further causes the computer to execute:
   acquiring setting information input on the setting screen; and
   transmitting the acquired setting information to the printer driver.

5. The non-transitory computer-readable storage medium according to claim 3, wherein the printing control apparatus executes an application program for outputting the print request, and the request regarding the print setting is transmitted by the application program.

6. The non-transitory computer-readable storage medium according to claim 5, wherein the printing control apparatus stores a print queue specifying the printing device, the print queue is associated in advance with the printer driver, and the program causes the computer to execute:

in a case where the application program outputs the print request specifying the print queue, acquiring the print request; and transmitting the acquired print request to the printer driver associated with the print queue.

7. The non-transitory computer-readable storage medium according to claim 1, the program further causes the computer to execute:

receiving a support information request requesting support information of the printing device; and transmitting the support information request to the printer driver.

8. The non-transitory computer-readable storage medium according to claim 1, wherein the program further causes the computer to cause a server to generate a bill, and the generation of the bill is based on the print information.

9. The non-transitory computer-readable storage medium according to claim 1, wherein the print information includes at least one of page count, drawing type, and page settings of the printing.

10. A printing control method performed by a printing control apparatus in which a printer driver for causing a printing device to perform printing runs on an operating system, the printing control method comprising:

causing an information acquisition module that is between the operating system and the printer driver to be installed in advance, wherein the information acquisition module is associated in advance with the printer driver, the printing control method further comprising, by the information acquisition module, acquiring a print request;

controlling, based on the acquired print request, the printer driver to cause the printing device to print;

receiving, from the printer driver, a response corresponding to the print request; and acquiring print information related to calculation of one of a print quantity or a cost of execution of the printing by the printing device, wherein the print information is acquired based on the print request.

11. The printing control method according to claim 10, wherein the printing control apparatus is connected to a server, the printing control method further comprising, by the information acquisition module, transmitting the print information acquired based on the print request to the server.

12. The printing control method according to claim 10, further comprising, by the information acquisition module:

receiving a request regarding a print setting;

requesting the printer driver to provide a setting screen based on the request; and acquiring the setting screen from the printer driver.

13. The printing control method according to claim 12, further comprising, by the information acquisition module:

acquiring setting information input on the setting screen; and transmitting the acquired setting information to the printer driver.

14. The printing control method according to claim 12, wherein the printing control apparatus executes an application program for outputting the print request, the printing control method further comprising, by the application program, transmitting the request regarding the print setting to the information acquisition module.

15. The printing control method according to claim 14, wherein the printing control apparatus stores a print queue specifying the printing device, the print queue is associated in advance with the printer driver, and in a case where the application program outputs the print request specifying the print queue, the printing control method comprises, by the information acquisition module:

acquiring the print request; and transmitting the print request to the printer driver associated with the print queue.

16. The printing control method according to claim 10, further comprising, by the information acquisition module:

receiving a support information request requesting support information of the printing device; and transmitting the support information request to the printer driver.

17. The printing control method according to claim 10, further comprising controlling the information acquisition module to transmit and receive communications between the operating system and the printer driver, wherein the information acquisition module serves as a virtual printer driver disposed between the operating system and the printer driver.

18. A printing control method performed by an information acquisition module in a printing control apparatus, the printing control method comprising:

acquiring a print request;

causing, based on the print request, a printer driver to execute printing by a printing device;

receiving, from the printer driver, a response corresponding to the print request; and sending print information, which is based on the print request, to outside, wherein the print information is related to calculation of one of a print quantity or a cost of the execution of the printing by the printing device.

19. The printing control method according to claim 18, wherein the printing control apparatus is connected to a server, the printing control method further comprising, by the information acquisition module, transmitting the print information acquired based on the print request to the server.

20. The printing control method according to claim 18, further comprising, by the information acquisition module:

receiving a request regarding a print setting;

requesting the printer driver to provide a setting screen; and acquiring the setting screen from the printer driver.

21. The printing control method according to claim 20, further comprising, by the information acquisition module:

acquiring setting information input on the setting screen; and transmitting the acquired setting information to the printer driver.

22. The printing control method according to claim 20, wherein the printing control apparatus executes an application program for outputting the print request, the printing control method further comprising, by the application program, transmitting the request regarding the print setting to the information acquisition module.

23. The printing control method according to claim 22, wherein the printing control apparatus stores a print queue specifying the printing device, the print queue is associated in advance with the printer driver, and in a case where the application program outputs the print request specifying the print queue, the printing control method comprises, by the information acquisition module:

acquiring the print request; and transmitting the print request to the printer driver associated with the print queue.

\* \* \* \* \*